US009588917B2

(12) United States Patent
Kotta et al.

(10) Patent No.: US 9,588,917 B2
(45) Date of Patent: Mar. 7, 2017

(54) TRACKING STATISTICS CORRESPONDING TO DATA ACCESS IN A COMPUTER SYSTEM

(71) Applicant: International Business Machines Corporation, Armonk, NY (US)

(72) Inventors: Srinivas Kotta, Hyderabad (IN); Mehulkumar J. Patel, Bangalore (IN); Venkatesh Sainath, Bangalore (IN); Vaidyanathan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 14/311,482

(22) Filed: Jun. 23, 2014

(65) Prior Publication Data
US 2015/0309948 A1 Oct. 29, 2015

Related U.S. Application Data

(63) Continuation of application No. 14/264,082, filed on Apr. 29, 2014.

(51) Int. Cl.
*G06F 13/36* (2006.01)
*G06F 13/28* (2006.01)
(Continued)

(52) U.S. Cl.
CPC .......... *G06F 13/28* (2013.01); *G06F 13/4027* (2013.01); *G06F 13/4221* (2013.01)

(58) Field of Classification Search
CPC .............. G06F 12/0835; G06F 13/285; G06F 13/2802; G06F 2213/28
(Continued)

(56) References Cited

U.S. PATENT DOCUMENTS 6,920,519 B1 7/2005 Beukema et al.
7,080,212 B1 7/2006 Hsu et al.
(Continued)

OTHER PUBLICATIONS

Li et al.; "A High Speed DMA Transaction Method for PCI Express Devices"; Journal of Electronic Science and Technology of China; vol. 7, No. 4; Dec. 2009; pp. 380-384.
(Continued)

*Primary Examiner* — Tim T Vo
*Assistant Examiner* — Kim T. Huynh
(74) *Attorney, Agent, or Firm* — Daniel R. Simek

(57) ABSTRACT

Embodiments of the present invention disclose a method, computer program product, and system for determining statistics corresponding to data transfer operations. In one embodiment, the computer implemented method includes the steps of receiving a request from an input/output (I/O) device to perform a data transfer operation between the I/O device and a memory, generating an entry in an input/output memory management unit (IOMMU) corresponding to the data transfer operation, wherein the entry in the IOMMU includes at least an indication of a processor chip that corresponds to the memory of the data transfer operation, monitoring the data transfer operation between the I/O device and the memory, determining statistics corresponding to the monitored data transfer operation, wherein the determined statistics include at least: the I/O device that performed the data transfer operation, the processor chip that corresponds to the memory of the data transfer operation, and an amount of data transferred.

7 Claims, 5 Drawing Sheets

(51) Int. Cl.
  *G06F 13/40* (2006.01)
  *G06F 13/42* (2006.01)

(58) Field of Classification Search
  USPC .............................. 710/308, 22, 20; 711/145
  See application file for complete search history.

(56) References Cited

U.S. PATENT DOCUMENTS

| | | | |
|---|---|---|---|
| 7,293,127 B2 | 11/2007 | Caruk | |
| 7,882,330 B2* | 2/2011 | Haertel | G06F 9/45558 711/203 |
| 2005/0216642 A1 | 9/2005 | Lee | |
| 2006/0242332 A1 | 10/2006 | Johnson et al. | |
| 2009/0086651 A1 | 4/2009 | Luft et al. | |
| 2009/0144508 A1* | 6/2009 | Freimuth | G06F 12/1027 711/145 |
| 2012/0203887 A1 | 8/2012 | Julien | |
| 2014/0089631 A1* | 3/2014 | King | G06F 12/1027 711/207 |

OTHER PUBLICATIONS

"Intel 440BX AGPset: 82443BX Host Bridge/Controller"; 82443BX Host Bridge Datasheet; Copyright Intel Corporation 1997-1998; Order No. 290633-001.

U.S. Appl. No. 14/264,082, filed Apr. 29, 2014 entitled Tracking Statistics Corresponding to Data Access in a Computer System.

Appendix P List of IBM Patents or Patent Applications Treated as Related.

* cited by examiner

| PARTITIONABLE ENDPOINT ID | PROCESSOR CHIP 120 | PROCESSOR CHIP 130 | PROCESSOR CHIP 160 | PROCESSOR CHIP 170 |
|---|---|---|---|---|
| 123 | 65 | 15 | 60 | 7 |
| 124 | 60 | 20 | 17 | 45 |
| 133 | 25 | 0 | 33 | 0 |
| 134 | 30 | 40 | 75 | 90 |
| 163 | 76 | 18 | 10 | 0 |
| 164 | 70 | 0 | 20 | 42 |
| 173 | 80 | 25 | 0 | 51 |
| 174 | 0 | 39 | 0 | 88 |

| PARTITIONABLE ENDPOINT ID | PROCESSOR CHIP 120 | PROCESSOR CHIP 130 | PROCESSOR CHIP 160 | PROCESSOR CHIP 170 |
|---|---|---|---|---|
| 123 | 65 | 15 | 60 | 87 |
| 124 | 60 | 66 | 17 | 45 |
| 133 | 25 | 0 | 33 | 0 |
| 134 | 30 | 40 | 75 | 90 |
| 163 | 76 | 18 | 10 | 0 |
| 164 | 70 | 0 | 20 | 42 |
| 173 | 80 | 25 | 0 | 51 |
| 174 | 0 | 39 | 0 | 88 |

TRACKING STATISTICS CORRESPONDING TO DATA ACCESS IN A COMPUTER SYSTEM

FIELD OF THE INVENTION

The present invention relates generally to the field of data access, and more particularly to tracking statistics corresponding to data access in a computer system.

BACKGROUND

Direct Memory Access (DMA) is a method for transferring data, utilized in computer bus architectures, that allows access and transfer of data independently of a central processing unit (CPU). DMA operations occur between storage locations on a computer system (e.g., random-access memory (RAM), and other storage locations) to internal or external components of the computing system (e.g., I/O devices, sound cards, graphics cards, Peripheral Component Interconnect Express (PCIe) devices, etc.). In an example, a sound card may need to access data stored on RAM of a computer system, but since the sound card includes internal processing capabilities, the sound card can utilize DMA to bypass the CPU and access the data stored on the RAM.

In computer systems that utilize Peripheral Component Interconnect (PCI) architecture, DMA operations can occur without a central DMA controller. Instead, PCI components (e.g., I/O devices, sound cards, graphics cards, PCIe devices, etc.) can request control of a computer bus (e.g., a PCI bus controller, or a PCI Host Bridge (PHB)) and request to read and write from memory of the computer system. In some examples, when PCI components request to control a computer from a PCI bus controller, the PCI bus controller arbitrates which PCI components are granted ownership of the bus, since only one PCI component can have ownership over the bus at one time.

SUMMARY

Embodiments of the present invention disclose a method, computer program product, and computer system for determining statistics corresponding to data transfer operations. In one embodiment, in accordance with the present invention, the computer implemented method includes the steps of receiving a request from an input/output (I/O) device to perform a data transfer operation between the I/O device and a memory, generating an entry in an input/output memory management unit (IOMMU) corresponding to the data transfer operation, wherein the entry in the IOMMU includes at least an indication of a processor chip that corresponds to the memory of the data transfer operation, monitoring the data transfer operation between the I/O device and the memory, determining statistics corresponding to the monitored data transfer operation, wherein the determined statistics include at least: the I/O device that performed the data transfer operation, the processor chip that corresponds to the memory of the data transfer operation, and an amount of data transferred in the data transfer operation. In another embodiment, the method further includes the step of tracking the determined statistics corresponding to the monitored data transfer operation in a cumulative tracking record that includes data corresponding to data transfer operations that are performed in a system over a period of time.

DETAILED DESCRIPTION

Embodiments of the present invention allow for the determination and tracking of data transfer statistics corresponding to Direct Memory Access (DMA) operations within computing systems (e.g., server nodes). In one embodiment, responsive to a request to perform a DMA operation, a Translation control entry is generated, which is utilized to perform the requested DMA operation. Statistics corresponding to the performed DMA operation are determined and tracked for each DMA operation that is performed in a server node. In other embodiments, the determined and tracked statistics correspond to other forms of data traffic between a partitionable endpoint and a memory (i.e., data transfer operations other than DMA traffic).

Embodiments of the present invention recognize that in computing environments that include multiple server nodes (e.g., blade servers operating in a symmetric multiprocessing (SMP) configuration, or other systems in an SMP configuration), I/O devices are located throughout the computing environment. In many examples, the I/O devices (e.g., sound cards, graphics cards, Peripheral Component Interconnect Express (PCIe) devices, etc.) may be located in a different server node of the computing environment relative to the execution location of a workload that is utilizing the I/O device.

Figure 1:
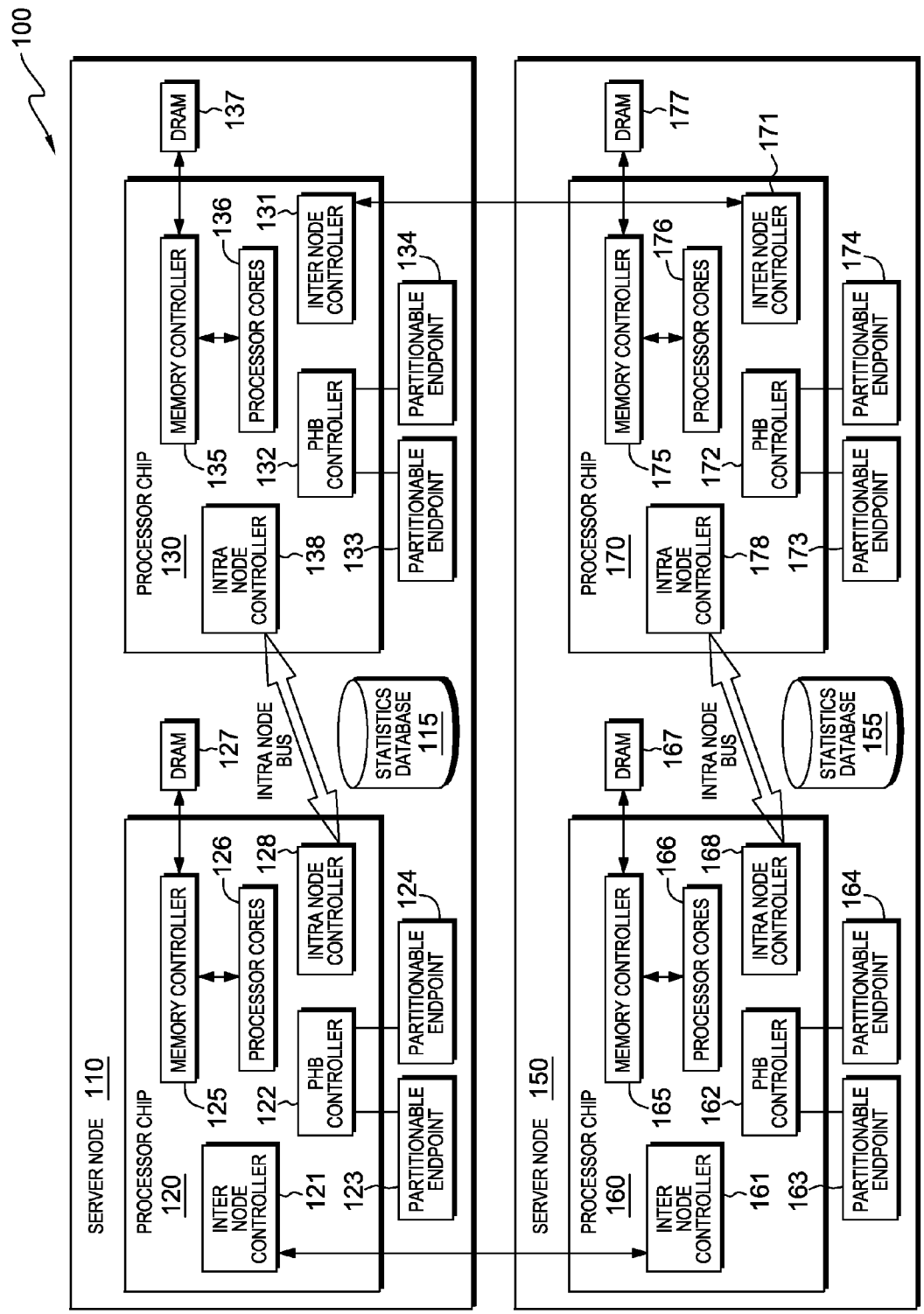
FIG. 1 is a functional block diagram of a data processing environment in accordance with an embodiment of the present invention.

The present invention will now be described in detail with reference to the Figures. FIG. 1 is a functional block diagram illustrating data processing environment 100, in accordance with one embodiment of the present invention.

An embodiment of data processing environment 100 includes server nodes 110 and 150. In example embodiments, server nodes 110 and 150 can be desktop computers, computer servers, or any other computer systems known in the art capable of performing functions in accordance with embodiments of the present invention. In certain embodiments server nodes 110 and 150 represent computer systems utilizing clustered computers and components (e.g., database server computers, application server computers, etc.) that act as a single pool of seamless resources when accessed by elements of data processing environment 100 (e.g., server nodes 110 and 150). In general, server nodes 110 and 150 are representative of any electronic device or combination of electronic devices capable of executing machine readable program instructions, as described in greater detail with regard to FIG. 5, in accordance with embodiments of the present invention.

In one embodiment, server nodes 110 and 150 are part of a cluster of server nodes that can include additional instances of server nodes. For example, server nodes 110 and 150 can be nodes of an SMP server or blade servers that are operating in a SMP configuration. In one embodiment, server nodes 110 and 150 communicate through network communications. Network communications can be, for example, a local area network (LAN), a telecommunications network, a wide area network (WAN) such as the Internet, or a combination of the three, and include wired, wireless, or fiber optic connections. In general, network communications can be any combination of connections and protocols that will support communications between server nodes 110 and 150 in accordance with embodiments of the present invention. In one embodiment, server nodes 110 and 150 can be partitioned into one or more virtual computing platforms (e.g., via logical partitioning (LPAR)). In another embodiment, server nodes 110 and 150 are partitions of a server computer.

Figure 5:
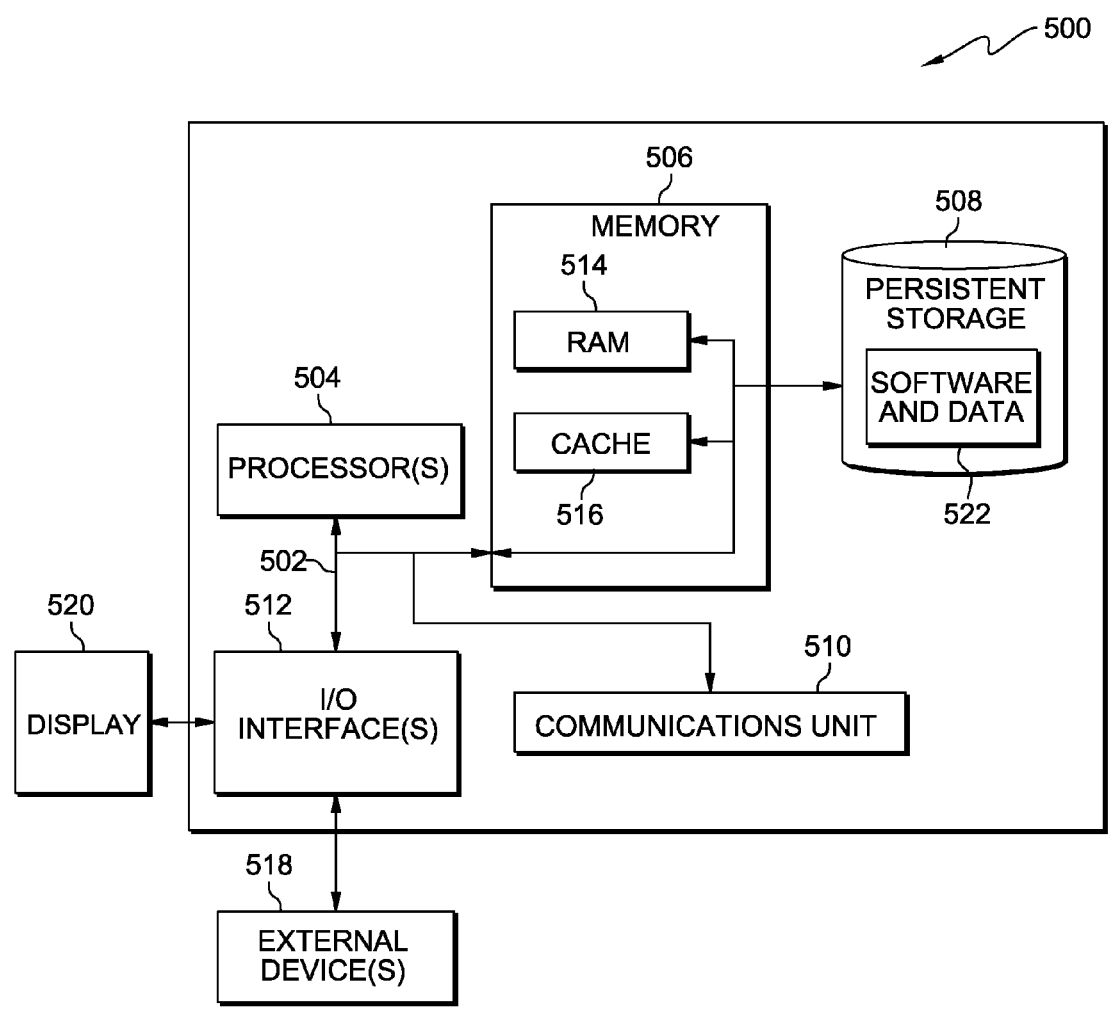
FIG. 5 depicts a block diagram of components of the computing systems of FIG. 1 in accordance with an embodiment of the present invention.

In one embodiment, server node 110 includes statistics database 115, processor chips 120 and 130, partitionable endpoints 123, 124, 133 and 134, and DRAM 127 and 137, and server node 150 includes statistics database 155, processor chips 160 and 170, partitionable endpoints 163, 164, 173 and 174, and DRAM 167 and 177. DRAM 127, 137, 167 and 177 are instances of dynamic random-access memory that are included on respective server nodes 110 and 150. In other embodiments, server nodes 110 and 150 can include other forms of data storage devices and other forms of suitable volatile or non-volatile computer readable storage media. Statistics databases 115 and 155 store statistics corresponding to Direct Memory Access (DMA) operations within server nodes 110 and 150. In example embodiments, the statistics data that is stored in statistics databases 115 and 155 is determined and tracked by statistic tracking program 200, which is discussed in further detail with regard to FIG. 2. Statistic databases 115 and 155 can be implemented with any type of storage device, for example, persistent storage 508 (as shown in FIG. 5), which is capable of storing data that may be accessed and utilized by server nodes 110 and 150, such as a database server, a hard disk drive, or flash memory. In other embodiments, statistic databases 115 and 155 can represent multiple storage devices within server nodes 110 and 150.

In one embodiment, partitionable endpoints 123, 124, 133, 134, 163, 164, 173 and 174 are devices that are capable of performing DMA operations on memory (e.g., DRAM 127, 137, 167 and 177) located within server nodes 110 and 150. In example embodiments, partitionable endpoints 123, 124, 133, 134, 163, 164, 173 and 174 are PCI or PCIe I/O devices, such as sound cards, graphics cards, Ethernet devices, and storage controller devices. Partitionable endpoints 123, 124, 133, 134, 163, 164, 173 and 174 can be internal components of server nodes 110 and 150. In other embodiments, partitionable endpoints 123, 124, 133, 134, 163, 164, 173 and 174 can be external components to server nodes 110 and 150, or components that are connected to server nodes 110 and 150 via network communications (e.g., Ethernet devices).

Processor chips 120, 130, 160 and 170 are instances of central processing units (CPUs) located within respective server nodes 110 and 150. In other embodiments, server nodes 110 and 150 can include additional instances of processor chips, and processor chips 120, 130, 160 and 170 can be partitioned in one or more virtual machines. Processor chips 120, 130, 160 and 170 include respective instances of internal components that include: inter node controllers 121, 131, 161 and 171, PCI Host Bridge (PHB) controllers 122, 132, 162 and 172, memory controllers 125, 135, 165 and 175, processor cores 126, 136, 166 and 176, and intra node controllers 128, 138, 168 and 178. In other embodiments, the internal components of processor chips 120, 130, 160 and 170 can be located within respective server nodes 110 and 150.

Inter node controllers 121, 131, 161 and 171 control communications and transfer of data between processor chips on different server nodes (e.g., between processor chips 120 and 130 on server node 110 and processor chips 160 and 170 on server node 150). In various embodiments, each instance of inter node controllers 121, 131, 161 and 171 has the capability to communicate and transfer data with any other instance of inter node controllers 121, 131, 161 and 171 that resides on another server node. For example, inter node controller 121 on server node 110 can communicate and transfer data with inter node controller 171 on server node 150. With regard to DMA operations, inter node controllers 121, 131, 161 and 171 are capable of transferring data (e.g., to PHB controllers 122, 132, 162 and 172) independent from utilizing processing capabilities (e.g., processor cores 126, 136, 166 and 176) of processor chips 120, 130, 160 and 170.

PHB controllers 122, 132, 162 and 172 facilitate interaction between components of respective processor chips 120, 130, 160 and 170, and respective instances of partitionable endpoints 123, 124, 133, 134, 163, 164, 173 and 174, and DRAM 127, 137, 167 and 177. In one embodiment, partitionable endpoints 123, 124, 133, 134, 163, 164, 173 and 174 can utilize PHB controllers 122, 132, 162 and 172 to facilitate and perform DMA operations to access and transfer data from memory of server nodes 110 and 150 (e.g., DRAM 127, 137, 167 and 177). In an example embodiment, PHB controllers 122, 132, 162 and 172 interface with respective instances of partitionable endpoints 123, 124, 133, 134, 163, 164, 173 and 174 via PCI and PCIe busses. In one embodiment, PHB controllers 122, 132, 162 and 172 include statistic tracking program 200. In other embodiments, statistic tracking program 200 is located within server nodes 110 and 150, and PHB controllers 122, 132, 162 and 172 include the capability to access and utilize statistic tracking program 200. In example embodiments, statistic tracking program 200 determines and tracks data transfer statistics corresponding to DMA operations.

Memory controllers 125, 135, 165 and 175 control and facilitate access to the computer memory of server nodes 110 and 150 (e.g., DRAM 127, 137, 167 and 177). In example embodiments, memory controllers 125, 135, 165 and 175 manage the data flow to and from DRAM 127, 137, 167 and 177 corresponding to DMA operations. In other embodiments, memory controllers 125, 135, 165 and 175 can be shown as a separate external component from processor chips 120, 130, 160 and 170, which interact with the processor chips. Memory controllers 125, 135, 165 and 175 can receive access requests from respective partitionable endpoints 123, 124, 133, 134, 163, 164, 173 and 174 (e.g., via PHB controllers 122, 132, 162 and 172), and respective processor cores 126, 136, 166 and 176. In an example embodiment, memory controllers 125, 135, 165 and 175 include the capabilities of a Memory Chip Controller (MCC). With regard to DMA operations, memory controllers 125, 135, 165 and 175 can allow access to data stored on respective instances of DRAM 127, 137, 167 and 177 independent from utilizing processing capabilities (e.g., processor cores 126, 136, 166 and 176) of processor chips 120, 130, 160 and 170.

Processor cores 126, 136, 166 and 176 include one or more CPUs of respective processor chips 120, 130, 160 and 170. In embodiments where processor chips 120, 130, 160 and 170 are multi core processors, each instance of processor cores 126, 136, 166 and 176 includes multiple CPUs. Processor chips 120, 130, 160 and 170 utilize processor cores 126, 136, 166 and 176 to perform operations within server nodes 110 and 150.

Intra node controllers 128, 138, 168 and 178 control communications and transfer of data between processor chips on the same server node (e.g., processor chips 120 and 130 on server node 110, and processor chips 160 and 170 on server node 150). In various embodiments, each instance of intra node controllers 128, 138, 168 and 178 has the capability to communicate and transfer data with any other instance of intra node controllers 128, 138, 168 and 178 that resides on the same server node. For example, intra node controller 128 can communicate and transfer data with intra node controller 138, via an intra node bus on server node 110. With regard to DMA operations, intra node controllers 128, 138, 168 and 178 are capable of transferring data (e.g., to PHB controllers 122, 132, 162 and 172) independent from utilizing processing capabilities (e.g., processor cores 126, 136, 166 and 176) of processor chips 120, 130, 160 and 170.

In an example embodiment, PHB controller 122 receives a DMA operation request to access data stored on DRAM 177 from partitionable endpoint 123. In this embodiment, PHB controller 122 facilitates the transfer of the requested data from DRAM 177 as a DMA operation (e.g., not utilizing processor cores 126 or 176) to partitionable endpoint 123, via communications between inter node controllers 121 and 171.

In another example embodiment, PHB controller 122 receives a DMA operation request to access data stored on DRAM 137 from partitionable endpoint 123. In this embodiment, PHB controller 122 facilitates the transfer of the requested data from DRAM 137 as a DMA operation (e.g., not utilizing processor cores 126 or 136) to partitionable endpoint 123, via communications between intra node controllers 128 and 138 (e.g., through an intra node bus).

Figure 2:
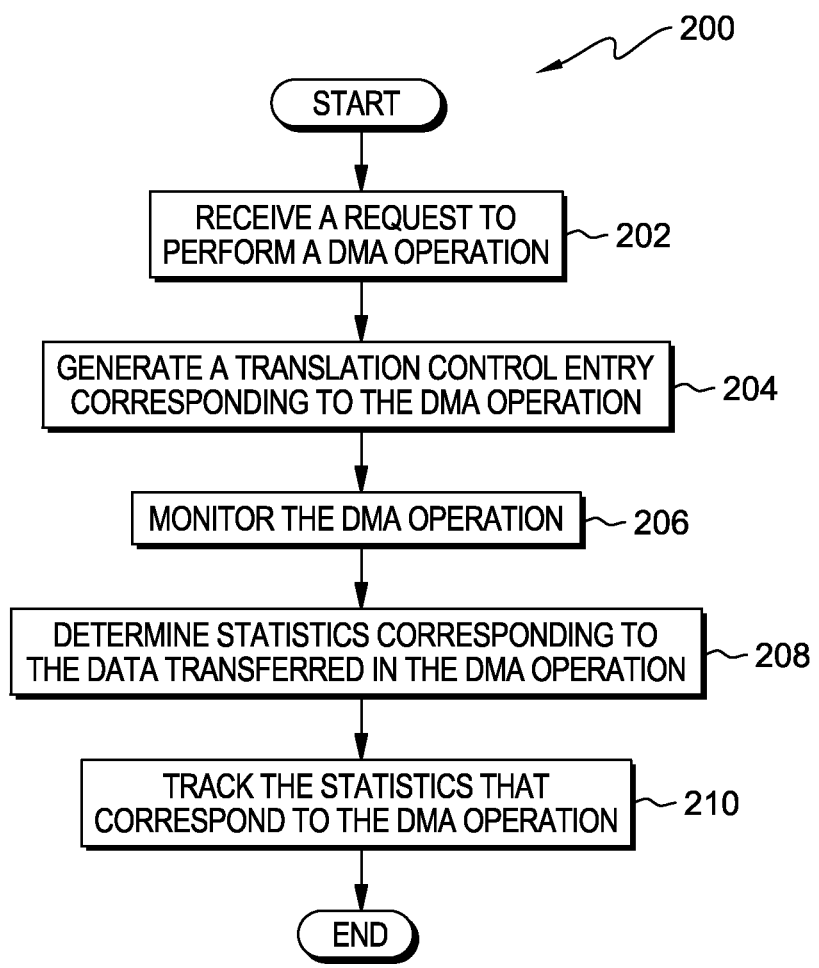
FIG. 2 is a flowchart depicting operational steps of a program for determining and tracking data transfer statistics corresponding to Direct Memory Access (DMA) operations, in accordance with an embodiment of the present invention.

FIG. 2 is a flowchart depicting operational steps of statistic tracking program 200 in accordance with an embodiment of the present invention. In one embodiment, statistic tracking program 200 initiates and operates for each DMA operation on server nodes 110 and 150. In another embodiment, statistic tracking program 200 is included within the functionality of PHB controllers 122, 132, 162 and 172. In other embodiments, statistic tracking program 200 initiates and operates for other forms of data transfers between partitionable endpoints (e.g., partitionable endpoints 123, 124, 133, 134, 163, 164, 173 and 174) and memory (e.g., DRAM 127, 137, 167 and 177) within server nodes (e.g., server nodes 110 and 150).

In step 202, statistic tracking program 200 receives a request to perform a DMA operation. In one embodiment, statistic tracking program 200 receives a request to perform a DMA operation, to access data stored on one of DRAM 127, 137, 167 or 177, from any one of partitionable endpoints 123, 124, 133, 134, 163, 164, 173 or 174, via the respective instance of PHB controllers 122, 132, 162 or 172. In an example embodiment, statistic tracking program 200 receives a request to map a memory buffer (i.e., an instance of DRAM 127, 137, 167 or 177 that corresponds to the DMA operation) for a DMA operation, and responsive to a request to map the memory buffer, system software of server nodes 110 and 150 maps memory buffers.

In step 204, statistic tracking program 200 generates a translation control entry corresponding to the DMA operation. In one embodiment, statistic tracking program 200 generates a translation control entry (TCE) based on information corresponding to the received request to perform the DMA operation (from step 202). A TCE translates virtual addresses that are generated by I/O devices (e.g., partitionable endpoints 123, 124, 133, 134, 163, 164, 173 and 174), for DMA operations, into physical system addresses. In other embodiments, the TCE can be an entry in an input/output memory management unit (IOMMU). For example, the TCE can be a DMA translation table entry (TTE), which is contained, along with additional entries, in a DMA translation table, which may be a component of an IOMMU. In example embodiments, before partitionable endpoints 123, 124, 133, 134, 163, 164, 173 and 174 can perform DMA operations, system software maps the respective instance of PHB controller 122, 132, 162 and 172 through generation of a TCE.

Figure 3A:
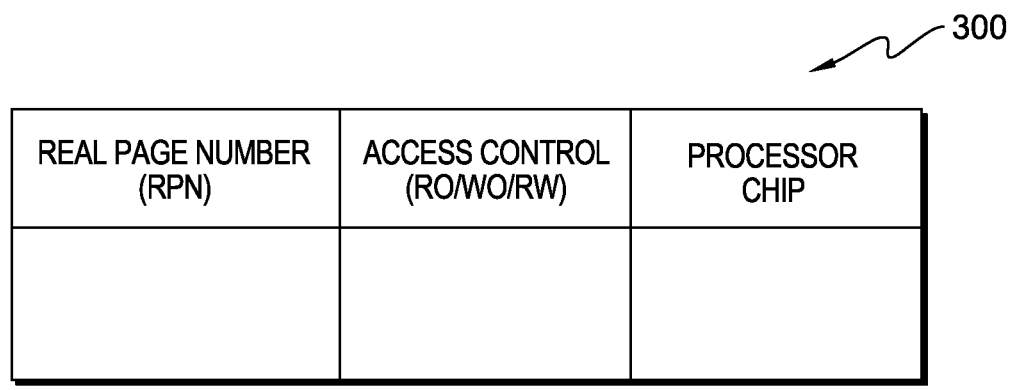
FIG. 3A illustrates an example of a translation control entry, in accordance with an embodiment of the present invention.

In various embodiments, a TCE is generated in the form of a table, which is depicted in FIG. 3A as translation control entry 300. An instance of translation control entry 300 is generated and populated responsive to each request for a DMA operation and request to map a memory buffer for DMA. Translation control entry 300 is a table that includes columns corresponding to data of: a real page number (RPN), access control (e.g., read-only (RO), write-only (WO), read/write (RW)), and a processor chip. Statistic tracking program 200 populates the RPN column with data corresponding to the specific location in the system memory (e.g., storage location within DRAM 127, 137, 167 and 177) where the data being accessed for the DMA operation is stored. Statistic tracking program 200 populates the access control column with data corresponding to the access capabilities of the data being accessed for the DMA operation (e.g., whether the data is RO, WO, or RW). Statistic tracking program 200 populates the processor chip column with data corresponding to which processor chip (e.g., processor chips 120, 130, 160 or 170) the storage location is locally attached (e.g., DRAM 127, 137, 167 or 177). For example, if the DMA operation includes a request to access data stored on DRAM 137 of processor chip 130, then statistic tracking program 200 populates the processor chip column with a data indication corresponding to processor chip 130. In example embodiments, statistic tracking program 200 can utilize the RPN to determine the corresponding processor chip. In other embodiments, translation control entry 300 can be an entry in an input/output memory management unit (IOMMU). For example, translation control entry 300 can be a DMA translation table entry (TTE), which is contained, along with additional entries, in a DMA translation table, which may be a component of an IOMMU. In another embodiment, recommendation program 200 generates the TCE entry, and stores the TCE entry in the corresponding instance of statistics database 115 or 155.

In step 206, statistic tracking program 200 monitors the DMA operation. In one embodiment, statistic tracking program 200 monitors the DMA operation while the corresponding instances of PHB controller 122, 132, 162 and 172 and partitionable endpoints 123, 124, 133, 134, 163, 164, 173 and 174 perform the requested DMA operation (from step 202) utilizing the generated TCE (from step 204). While the partitionable endpoint performs the DMA operation, statistic tracking program 200 monitors the amount and location of data that is transferred. In various embodiments, statistic tracking program 200 and the corresponding instance of PHB controller 122, 132, 162 and 172 facilitate the DMA operation, utilizing the data processing capabilities of the instance of partitionable endpoints 123, 124, 133, 134, 163, 164, 173 and 174 that requested the DMA operation. In an example embodiment, while a partitionable endpoint (e.g., partitionable endpoints 123, 124, 133, 134, 163, 164, 173 or 174) is performing a DMA operation, statistic tracking program 200 intercepts the DMA operation that is being performed, analyzes the corresponding TCE (generated in step 204), and utilizes the information in the TCE to monitor the amount of data that is being transferred in the DMA operation. In various embodiments, system software of server nodes 110 and 150 maps memory buffers (e.g., DRAM 127, 137, 167 and 177) of respective processor chips for DMA operations prior to the partitionable endpoint initiating and performing the DMA operation.

In step 208, statistic tracking program 200 determines statistics corresponding to the data transferred in the DMA operation. In one embodiment, statistic tracking program 200 determines statistics that include a storage location and an amount of data transferred. The storage location includes a location (e.g., DRAM 127, 137, 167 or 177 attached to respective processor chips 120, 130, 160 or 170) from which the data in the DMA operation was transferred (transferred and monitored in step 206). The amount of data transferred includes an amount of data (e.g., 1 gigabyte (GB), 512 megabytes (MB), etc.) that was transferred in the DMA operation. Statistic tracking program 200 utilizes the TCE corresponding to the DMA operation (generated in step 204) to determine statistics that correspond to the data transferred in the DMA operation. For example, in translation control entry 300, the processor chip column provides an indication of the node (e.g., processor chips 120, 130, 160 or 170) to which the storage location (e.g., DRAM 127, 137, 167 or 177) of the data transferred in the DMA operation is locally attached, which corresponds to the storage location component of the determined statistics. In various embodiments, the data transferred in DMA operations can be an inter node data transfer, or an intra node data transfer (e.g., via inter node controllers 121, 131, 161 and 171 or intra node controllers 128, 138, 168 and 178).

Figure 3B:
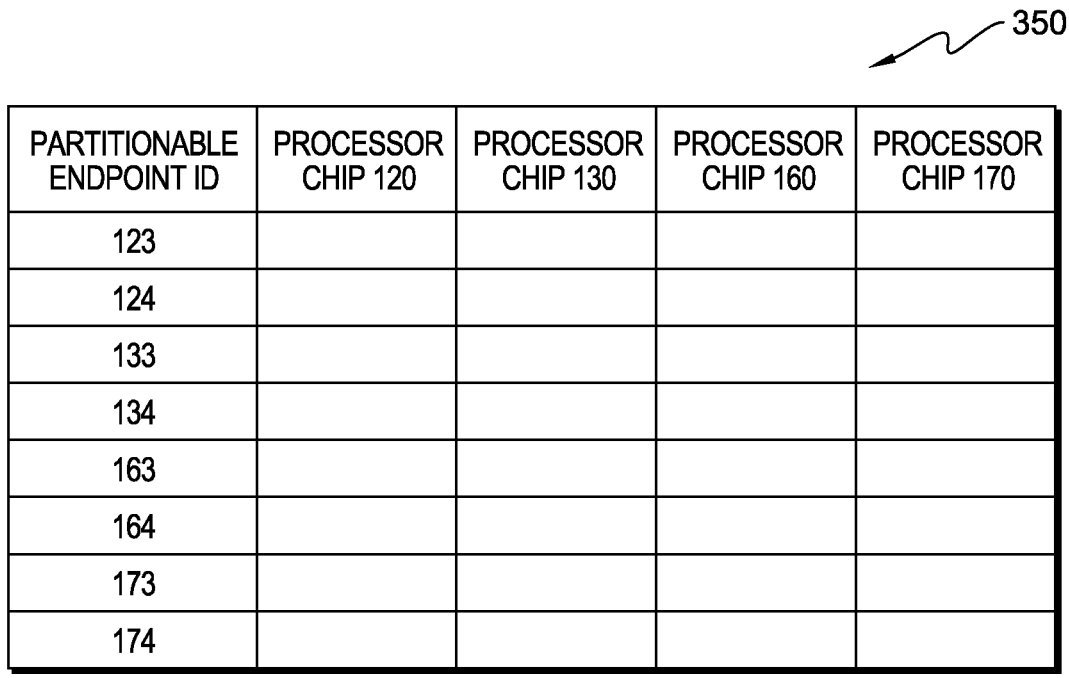
FIG. 3B illustrates an example table for tracking statistics corresponding to data transfers in DMA operation of one or more server nodes, in accordance with an embodiment of the present invention.

In step 210, statistic tracking program 200 tracks the statistics that correspond to the DMA operation. In one embodiment, statistic tracking program 200 utilizes the determined statistics (from step 208) to increment a cumulative tracking record corresponding to DMA operations performed in server nodes 110 and 150 (e.g., a table or chart in statistics database 115 and 155). In various embodiments, statistic tracking program 200 tracks determined statistics in the form of a table, which is depicted in FIG. 3B as DMA statistics table 350. In one example embodiment, a single instance of DMA statistics table 350 exists corresponding to all server nodes in data processing environment 100 (e.g., one global instance of DMA statistics table 350 for both server nodes 110 and 150). In another example embodiment, an instance of DMA statistics table 350 can exist corresponding to a combination of one or more of partitionable endpoints 123, 124, 133, 134, 163, 164, 173 and 174 (i.e., multiple instances of DMA access statistics table 350 stored in statistics databases 115 and 155). In other embodiments, the statistics tracking program 200 determines and tracks statistics corresponding to other forms of data traffic between a partitionable endpoint and a memory (i.e., other than DMA traffic).

DMA statistics table 350 is a table that includes columns corresponding to data of a partitionable endpoint ID and a column for each processor chip in server nodes 110 and 150. The number of rows in DMA statistics table 350 corresponds to the number of partitionable endpoints in server nodes 110 and 150 that are attached to a respective instance of PHB controller 122, 132, 162 and 172. For example, in the depicted instance of DMA statistics table 350, a row exists for each of partitionable endpoints 123, 124, 133, 134, 163, 164, 173 and 174. Statistic tracking program 200 populates each entry in DMA statistics table 350 with the cumulative amount of data transferred, in DMA operations, from a particular storage location associated with a processor chip to a particular partitionable endpoint. For example, if a DMA operation involves transferring 100 MB of data from DRAM 137 to partitionable endpoint 164, then statistic tracking program 200 increments the corresponding entry in DMA statistics table corresponding to the 100 MB DMA operation (i.e., adds 100 MB to the amount of data tracked in the entry in DMA statistics table that corresponds to processor chip 130 and partitionable endpoint 164).

In other embodiments, DMA statistics table 350 can be accessed and utilized to understand how data is transmitted in DMA operations of data processing environment 100. In an example embodiment, hypervisor software can access DMA statistics table 350 to determine an amount of data that has been transferred between each partitionable endpoint and processor chip, and corresponding data storage (e.g., through entries in DMA statistics table 350 corresponding to the partitionable endpoint and the processor chip). In additional embodiments, hypervisor software, or an individual associated with data processing environment 100 (e.g., an administrator associated with server nodes 110 and 150), can determine recommendations for configurations of partitionable endpoints in data processing environment (e.g., to optimize placement of I/O devices to increase data throughput and response time).

In an example embodiment of a DMA operation, responsive to receiving a request to perform a DMA operation (step 202), system software of the corresponding server node (e.g., server node 110 or 150) maps the corresponding memory buffer of the DMA operation (e.g., DRAM 127, 137, 167 or 177). During the mapping of the corresponding memory buffer, TCE is generated (e.g., translation control entry 300), which includes an indication of a processor chip that corresponds to the memory buffer (e.g., processor chip 120 corresponds to DRAM 127, processor chip 130 corresponds to DRAM 137, etc.). Utilizing the generated TCE, system software of the server node programs the partitionable endpoint that requested the DMA operation (e.g., partitionable endpoints 123, 124, 133, 134, 163, 164, 173 or 174) to perform the DMA operation. The partitionable endpoint then is capable of performing the DMA operation. During the DMA operation, statistics tracking program 200 monitors, tracks and determines (e.g., via intercepting and tracking the DMA operation) statistics of the DMA operation, which include the amount and location of data that is transferred in the DMA operation. For example, statistics tracking program 200 can utilize a cumulative tracking record corresponding to DMA operations (e.g., DMA statistics table 350) to track the determined statistics of the DMA operation.

Figure 4A:
FIGS. 4A and 4B illustrate example tables for tracking statistics corresponding to data transfers in DMA operation of one or more server nodes that are populated with sample data, in accordance with an embodiment of the present invention.

In example embodiments, FIG. 4A is a depiction of sample DMA statistics table 400, which is an example of a cumulative tracking record for DMA operations performed in server nodes 110 and 150 over a period of time. In various embodiments, statistics tracking program 200 populates entries of sample DMA statistics table 400 with the cumulative amount of data, in MB, that has been transferred between partitionable endpoints and a storage location (that is associated with a processor chip) via DMA operations. Statistics tracking program 200 can access and modify sample DMA statistics table 400, which is stored on statistics database 115 and 155. In another embodiment, entries in DMA statistics table 400 can be reset (e.g., by a hypervisor or statistics tracking program 200). For example, if an I/O device is removed from a system, or a certain period of time has elapsed, then hypervisor software or statistics tracking program 200 may reset one or more entries in DMA statistics table 400.

In one example, partitionable endpoint 123 is a PCIe graphics card that is requesting to perform a DMA operation to access data that is stored on DRAM 177, which is locally attached to processor chip 170. In this example, statistics tracking program 200 receives the request to perform the DMA operation from partitionable endpoint 123 (in step 202). Then statistics tracking program 200 generates a TCE corresponding to the received DMA operation (step 204). In this example, statistics tracking program 200 populates translation control entry 300 with data indicating the RPN address of the data that partitionable endpoint 123 is requesting to access, the access control corresponding to the data that partitionable endpoint 123 is requesting to access, and the processor chip in which DRAM 177 is locally attached (i.e., processor chip 170).

Partitionable endpoint 123 utilizes the generated TCE (i.e., the populated instance of translation control entry 300 from step 204) to perform the corresponding DMA operation, along with PHB controller 122 (step 206). The DMA operation is performed utilizing the data processing capabilities of partitionable endpoint 123. In one embodiment, the data corresponding to the DMA operations is transferred from DRAM 177 to partitionable endpoint 123 through inter node controllers 121 and 171 and memory controllers 125 and 175. During the DMA operation, statistics tracking program 200 and PHB controller 122 monitor the amount and location of the data transfer. Statistics tracking program 200 determines that the amount of data transferred in the DMA operation is 80 MB, from DRAM 177, which is locally attached to processor chip 170, to partitionable endpoint 123 (step 208). Then statistics tracking program 200 tracks the determined statistics that correspond to the DMA operation (step 210).

Figure 4B:

In this example, statistics tracking program 200 updates sample DMA statistics table 400 with the determined statistics. To update sample DMA statistics table 400, statistics tracking program 200 increments the entry in sample DMA statistics table 400 that corresponds to partitionable endpoint 123 and processor chip 170 by 80 MB (i.e., the determined statistics from step 208). In this example, updated DMA statistics table 410, FIG. 4B, depicts sample DMA statistics table 400 updated to include the determined statistics corresponding to the DMA operation between partitionable endpoint 123 and DRAM 177. Updated DMA statistics table 410 depicts a total of 87 MB transferred between partitionable endpoint 123 and DRAM 177 of processor chip 170, which is the cumulative amount of data that has been transferred via DMA operations between partitionable endpoint 123 and DRAM 177 of processor chip 170.

In another example, partitionable endpoint 124 is a PCIe Ethernet device (e.g., a network interface controller (NIC)) that is requesting to perform a DMA operation to access data that is stored on DRAM 137, which is locally attached to processor chip 130. In this example, statistics tracking program 200 receives the request to perform the DMA operation from partitionable endpoint 124 (in step 202). Then statistics tracking program 200 generates a TCE corresponding to the received DMA operation (step 204). In this example, statistics tracking program 200 populates translation control entry 300 with data indicating the RPN address of the data that partitionable endpoint 124 is requesting to access, the access control corresponding to the data that partitionable endpoint 124 is requesting to access, and the processor chip in which DRAM 137 is locally attached (i.e., processor chip 130).

Partitionable endpoint 124 utilizes the generated TCE (i.e., the populated instance of translation control entry 300 from step 204) to perform the corresponding DMA operation, along PHB controller 122 (step 206). The DMA operation is performed utilizing the data processing capabilities of partitionable endpoint 124. In one embodiment, the data corresponding to the DMA operations is transferred from DRAM 137 to partitionable endpoint 124 through intra node controllers 128 and 138, via an intra node bus, and memory controllers 125 and 175. During the DMA operation, statistics tracking program 200 and PHB controller 122 monitor the amount and location of the data transfer. Statistics tracking program 200 determines that the amount of data transferred in the DMA operation is 46 MB, from DRAM 137, which is locally attached to processor chip 130, to partitionable endpoint 124 (step 208). Then statistics tracking program 200 tracks the determined statistics that correspond to the DMA operation (step 210).

In this example, statistics tracking program 200 updates sample DMA statistics table 400 with the determined statistics. To update sample DMA statistics table 400, statistics tracking program 200 increments the entry in sample DMA statistics table 400 that corresponds to partitionable endpoint 124 and processor chip 130 by 46 MB (i.e., the determined statistics from step 208). In this example, updated DMA statistics table 410, FIG. 4B, depicts sample DMA statistics table 400 updated to include the determined statistics corresponding to the DMA operation between partitionable endpoint 124 and DRAM 137. Updated DMA statistics table 410 depicts a total of 46 MB transferred between partitionable endpoint 124 and DRAM 137 of processor chip 130, which is the cumulative amount of data that has been transferred via DMA operations between partitionable endpoint 124 and DRAM 137 of processor chip 130.

FIG. 5 depicts a block diagram of components of computer 500, which is representative of server nodes 110 and 150 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. In general, memory 506 can include any suitable volatile or non-volatile computer readable storage device. Software and data 522 are stored in persistent storage 508 for access and/or execution by processors 504 via one or more memories of memory 506. With respect to server nodes 110 and 150, software and data 522 represents statistics tracking program 200.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 may include one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data 522 can be stored on such portable computer readable storage media and can be loaded onto persistent storage 508 via I/O interface(s) 512. I/O interface(s) 512 also can connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for determining statistics corresponding to data transfer operations, the method comprising the steps of:
   receiving a request from an input/output (I/O) device to perform a direct memory access (DMA) data transfer operation between the I/O device and a memory;
   generating an entry in an input/output memory management unit (IOMMU) corresponding to the DMA data transfer operation, wherein the entry in the IOMMU includes at least an indication of a processor chip that corresponds to the memory of the DMA data transfer operation;
   monitoring the DMA data transfer operation between the I/O device and the memory,
      wherein monitoring the DMA data transfer operation includes determining statistics, during execution the DMA data transfer operation, corresponding to the monitored DMA data transfer operation,
      wherein the determined statistics include at least: the I/O device that performed the DMA data transfer operation, the processor chip that corresponds to the memory of the DMA data transfer operation, and an amount of data transferred in the DMA data transfer operation;
   tracking, during execution the DMA data transfer operation, the determined statistics corresponding to the monitored DMA data transfer operation in a cumulative tracking record that includes data corresponding to DMA data transfer operations that are performed in a system over a period of time; and
   determining recommendations of configurations of I/O devices in a data processing environment, based on tracked amounts of data transferred during DMA data transfer operations between I/O devices and memory in the data processing environment, wherein the determined recommendations of configurations optimize placement of I/O devices to increase data throughput and response time.

2. The method in accordance with claim 1, wherein the I/O device is a Peripheral Component Interconnect (PCI) or a Peripheral Component Interconnect Express (PCIe) device that is capable of performing DMA operations on memory within a system.

3. The method in accordance with claim 1, wherein the step of receiving a request from an input/output (I/O) device to perform a DMA data transfer operation between the I/O device and a memory, further comprises the step of:
   mapping a memory buffer corresponding to the received request to perform a DMA data transfer operation prior to initiation of the DMA data transfer operation.

4. The method in accordance with claim 1, wherein the generated entry in the IOMMU is a Translation Control Entry (TCE) that includes indications of at least: a storage location of data being transferred in the DMA data transfer operation, an indication of access control for the data being transferred in the DMA data transfer operation, and an indication of the processor chip that corresponds to the memory of the DMA data transfer operation.

5. The method in accordance with claim 1, wherein the DMA data transfer operation is initiated and performed utilizing data processing capabilities of the I/O device that requested to perform the DMA data transfer operation.

6. The method in accordance with claim 1, wherein monitoring the DMA data transfer operation and determining statistics of the DMA data transfer operation further includes tracking, utilizing a PCI Host Bridge (PHB) controller during execution the DMA data transfer operation, the determined statistics corresponding to the monitored DMA data transfer operation.

7. The method in accordance with claim 4, wherein monitoring the DMA data transfer operation and determining statistics of the DMA data transfer operation further includes tracking, utilizing a TCE entry corresponding to the DMA data transfer operation during execution the DMA data transfer operation, the determined statistics corresponding to the monitored DMA data transfer operation.

\* \* \* \* \*